United States Patent
Pandey et al.

(10) Patent No.: US 11,781,027 B2
(45) Date of Patent: Oct. 10, 2023

(54) PRINTABLE MIXED FILLERS EPOXY COMPOSITES

(71) Applicant: PALO ALTO RESEARCH CENTER INCORPORATED, Palo Alto, CA (US)

(72) Inventors: Rahul Pandey, Cupertino, CA (US); Junhua Wei, Palo Alto, CA (US); Gabriel Iftime, Newark, CA (US); Jamie Kalb, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 3 days.

(21) Appl. No.: 17/340,770

(22) Filed: Jun. 7, 2021

(65) Prior Publication Data

US 2022/0389247 A1    Dec. 8, 2022

(51) Int. Cl.
  *C09D 11/102* (2014.01)
  *B33Y 10/00* (2015.01)
  (Continued)

(52) U.S. Cl.
  CPC ............ *C09D 11/102* (2013.01); *B29B 7/90* (2013.01); *B29C 64/106* (2017.08);
  (Continued)

(58) Field of Classification Search
  CPC ....... C09D 11/102; C09D 11/037; B29B 7/90; B29C 64/106; B29C 64/314; B33Y 10/00;
  (Continued)

(56) References Cited

U.S. PATENT DOCUMENTS 9,718,914 B2    8/2017  Iftime et al.
10,906,238 B1   2/2021  Agarwal et al.
(Continued)

FOREIGN PATENT DOCUMENTS

CN  108102299 A   6/2018
CN  110615971 A   12/2019
JP  2016-195213   11/2016

OTHER PUBLICATIONS

Bao et al: In Situ preparation of functionalize graphene/epoxy nanocomposite with effective reinforcements, J. Mater. Chem., 2011, 21, 13290-13298. (Year: 2011).*
Luo, Yuancong et al. "Fabrication of a three-dimensional reinforcement via grafting epoxy functionalized graphene oxide into carbon fibers," Materials Letters 209 (2017), pp. 463-466.
(Continued)

*Primary Examiner* — Nahida Sultana
(74) *Attorney, Agent, or Firm* — Miller Nash LLP (57) ABSTRACT

A composition of matter comprises at least 10 wt % epoxy functionalized two-dimensional shaped particles, carbon nanotubes in the range of 0.1 to 5 wt %, epoxy resin and a curing agent. A method of manufacturing a composition of matter includes mixing epoxy resin, carbon nanotubes and a solvent to produce a material, drying the material, and mixing the material with a curing agent to product the composition of matter. A method of printing a composition of matter includes producing the composition of matter by combining epoxy functionalized graphene, carbon nanotubes, epoxy base resin, and a curing agent, extrusion printing the composition of matter into a desired pattern, and curing the pattern.

20 Claims, 7 Drawing Sheets

(51) Int. Cl.

| | |
|---|---|
| *B33Y 70/00* | (2020.01) |
| *B29C 64/314* | (2017.01) |
| *B29C 64/106* | (2017.01) |
| *B33Y 40/10* | (2020.01) |
| *B29B 7/90* | (2006.01) |
| *C09D 11/037* | (2014.01) |
| *B29K 63/00* | (2006.01) |
| *B29K 105/16* | (2006.01) |
| *B29K 507/04* | (2006.01) |
| *B82Y 30/00* | (2011.01) |
| *B82Y 40/00* | (2011.01) |

(52) U.S. Cl.
CPC ............ *B29C 64/314* (2017.08); *B33Y 10/00* (2014.12); *B33Y 40/10* (2020.01); *B33Y 70/00* (2014.12); *C09D 11/037* (2013.01); *B29K 2063/00* (2013.01); *B29K 2105/167* (2013.01); *B29K 2507/04* (2013.01); *B82Y 30/00* (2013.01); *B82Y 40/00* (2013.01)

(58) Field of Classification Search
CPC .... B33Y 40/10; B33Y 70/00; B29K 2063/00; B29K 2105/167; B29K 2507/04; B82Y 30/00; B82Y 40/00
See application file for complete search history.

(56) References Cited

U.S. PATENT DOCUMENTS

| | | | |
|---|---|---|---|
| 2011/0017955 A1* | 1/2011 | Zhamu | C08G 59/5033 252/182.13 |
| 2014/0126130 A1 | 5/2014 | Aurongzeb | |
| 2016/0193751 A1 | 7/2016 | Humfeld | |
| 2016/0200920 A1 | 7/2016 | Cauchon et al. | |
| 2019/0194417 A1 | 6/2019 | Wei et al. | |
| 2021/0079193 A1 | 3/2021 | Wei et al. | |

OTHER PUBLICATIONS

Bao, Chenlu et al. "In situ preparation of functionalized graphene oxide/epoxy nanocomposites with effective reinforcements" J. Materials Chemistry 21 (2011), pp. 13290-132098.

Lu, Shaorong et al. "Epoxy nanocomposites filled with thermotropic liquid crystalline epoxy grafted graphene oxide" RCS Advances 3 (2013) pp. 8915-8923.

Kowalczyk K. and Spychaj, T. "Ionic Liquids as Convenient Latent Hardeners of Epoxy Resigns" Polimery, 48:11-12, (Jan. 1, 2003) pp. 833-835.

Li et al. "Synthesis and characterization of reinforced acrylate photosenstive resin by 2-hydroxyethyl methacrylate-functionalized graphene nanosheets for 3D printing" J. Materials Science (2018) 53, pp. 1874-1886.

Xia et al. "Functionalied graphene serving as free radical scavenger and corrosion protection in gamma-irradiated epoxy composites" Carbon 101 (2016), pp. 315-323.

Wan et al. "Grafting of expoxy chains onto graphene oxide for epoxy composites with improved mechanical and thermal properties," Carbon 69 (2014), pp. 467-480.

Li et al. "Control of the functionality of graphene oxide for its application in epoxy nanocomposites" Polymer 54 (2013) pp. 6437-6446.

Rafiee, M.A. et al. "Enhanced Mechanical Properties of Nanocomposites at Low Graphene Content", ASC NANO, 2009, pp. 3884-3890.

Yu et al., Enhanced Thermal Conductivity in a Hybrid Graphite Nanoplatelet—Carbon Nanotube Filler for Epoxy Composites, Adv. Mater. 2008, 20, 4740-4744.

Im et al.,Thermal conductivity of a graphene oxide-carbon nanotube hybrid/epoxy composite,, Carbon 50 (2012) 5429-5440.

Li et al., Carbon nanotube-graphene nanoplatelet hybrids as high performance multifunctional reinforcements in epoxy composites, Composites Science and Technology 74 (2013) 221-227.

Yue et al., Epoxy composites with carbon nanotubes and graphene nanoplatelets—Dispersion and synergy effects, Carbon 78 (2014) 268-278.

Qi et al., Synergistic effect of functionalized graphene oxide and carbon nanotube hybrids on mechanical properties of epoxy composites, RSC Adv., 2018, 8, 38689.

\* cited by examiner

PRINTABLE MIXED FILLERS EPOXY COMPOSITES

TECHNICAL FIELD

This disclosure relates to three-dimensional printable composites, more particularly 3D printable composites with high loading of functionalized particles.

BACKGROUND

New three-dimensional (3D) particle-filled epoxy polymer composites, such as thermosets, have advantages over established thermoplastic polymer composites. They have improved mechanical properties such as strength and elastic modulus. These composites form robust structures with high crosslinking density after curing, resulting in exceptional mechanical properties. Polymer composites used in aerospace, energy, and automotive applications must have superior mechanical properties.

Achieving significantly better mechanical properties require high filler particle loadings, such as greater than 10 wt % of the overall composite. However, particle agglomeration and poor particle dispersion in the epoxy matrix make achieving the higher particle loading very difficult. Because of these issues, high particle loading results in inferior mechanical properties. Specifically, a major challenge arises in achieving increased elastic modulus while maintaining high strength. Such formulations cannot be used for 3D printing.

The major challenge to use these composite formulation for extrusion 3D printing lies in meeting the key rheology requirements of low viscosity under shear during extrusion, and rapid increase in viscosity and elasticity after extrusion, required to retain 3D printed shape after extrusion. Highly dispersible particles do not form a strong network in the resin and do not display viscosity suitable for 3D printing even at high particle concentration, making it hard to meet the rheology requirements. Some approaches add rheology modifiers such as clay particles to tune the rheology of the composites. This results in inferior mechanical properties of composites, such as reduced toughness and strength.

Current approaches disclose a range of epoxy composites incorporating two-dimensional graphene, carbon nanotube (CNT) reinforcing particles, not suitable for extrusion 3D printing due to at least one of several issues. These issues include low graphene particle loading, typically at less than 2 wt %, with low viscosity and do not display the shear thinning behavior with required elasticity for 3D printing. Other composite materials have high particle loading, of graphene and CNTs, but poor dispersion result in inhomogeneity in filler distribution, resulting in poor printability. For epoxy formulations with an A+B system, incorporating an amine hardener as curing agent, they cure rapidly at room temperature resulting in clogged tubing and nozzles of an extrusion printer.

SUMMARY

According to aspects illustrated here, there is provided a composition of matter comprising at least 10 wt % epoxy functionalized two-dimensional shaped particles, carbon nanotubes in the range of 0.1 to 5 wt %, epoxy resin and a curing agent.

According to aspects illustrated here, there is provided a method of manufacturing a composition of matter that includes mixing epoxy resin, carbon nanotubes and a solvent to produce a material, drying the material, and mixing the material with a curing agent to product the composition of matter.

According to aspects illustrated here, there is provided a method of printing a composition of matter that includes producing the composition of matter by combining epoxy functionalized graphene, carbon nanotubes, epoxy base resin, and a curing agent, extrusion printing the composition of matter into a desired pattern, and curing the pattern.

DETAILED DESCRIPTION OF THE EMBODIMENTS

The embodiments here involve epoxy composite formulation incorporating high loading, greater than 10 wt %, of functionalized 2D shaped particles, such as graphene, clay and others, and a small fraction of carbon nanotubes that can be directly 3D printed through extrusion printing. Cured structures of these formulations showed superior mechanical properties when compared with structures of formulations made with base resin alone or with epoxy resin plus 2D particles.

Palo Alto Research Center (PARC) has done extensive work on increasing the particle loading of composites. These approaches addressed the problem using functionalized filler particles, with excellent dispersibility when compared with conventional non-functionalized particles formulation. The functionalized filler particle composites resulted in cured structures having greater than 300% higher elastic modulus while maintaining tensile strength.

Figure 1:
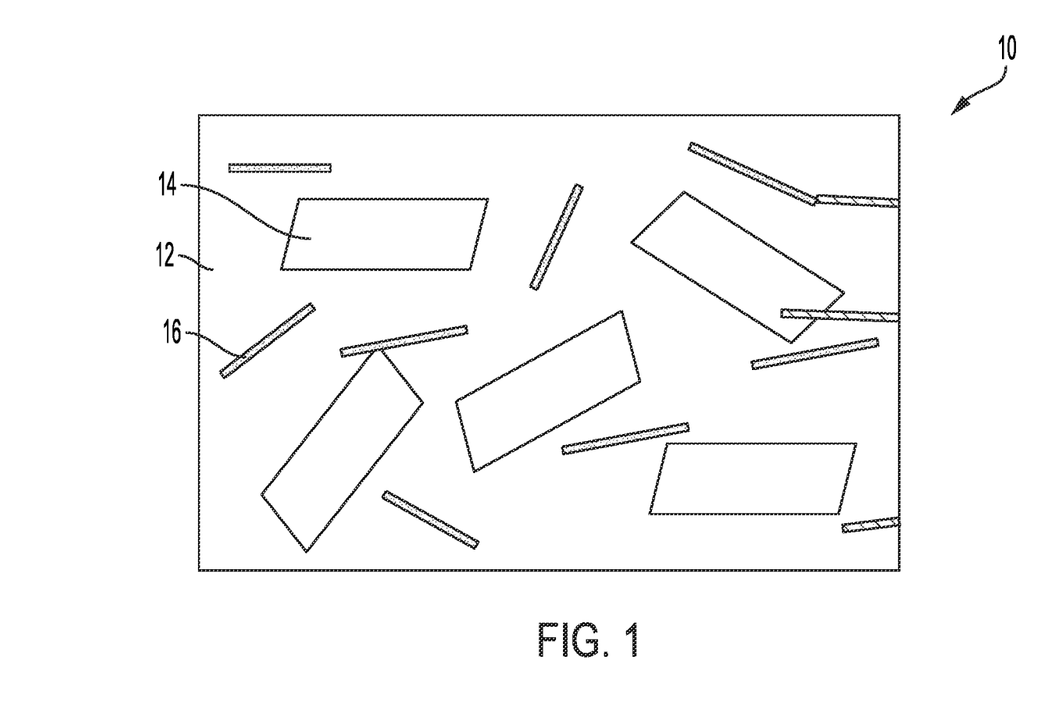
FIG. 1 shows a graphical representation of an embodiment of a composition of matter.

FIG. 1 shows a graphical representation of a composition of matter 10. In the representation of FIG. 1, the background represents the epoxy matrix 12, which includes functionalized 2D particles 14 such as graphene, clay, fumed silica, and others. A "functionalized" particle comprise a particle that has functional groups attached to the particle that can form bonds with other particles. In some of PARC's work, these functional groups formed linked particle networks with the other particles. Examples of these include U.S. Pat. Nos. 10,882,972, and 10,138,317, incorporated by reference herein in their entirety. The particles here are "epoxy-functionalized" meaning that they have epoxy groups.

The composition of matter of the embodiments includes carbon nanotubes (CNTs). As will be discussed further, the CNTs may be single-walled nanotubes (SWNTs), multi-walled nanotubes, functionalized nanotubes, where the functionalized nanotubes may have at least one carboxyl (COOH) group or epoxy groups, as examples. Other functional groups may also be added. The nanotubes with carboxyl functional groups may also be referred to as carboxylated nanotubes, and those with epoxy groups may be referred to as epoxy-functionalized nanotubes. The term "carbon nanotubes" includes any variation of CNTs, including those above as examples.

Figure 2:
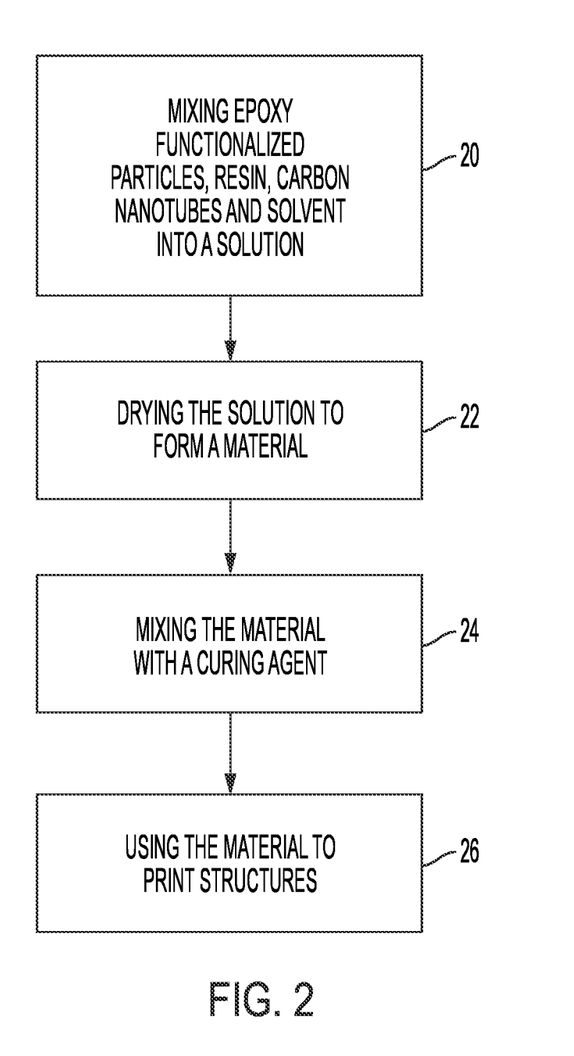
FIG. 2 shows a flowchart of an embodiment of a method for manufacturing a composition of matter.

FIG. 2 shows a flowchart of an embodiment of a method to manufacture a composition of matter. At 20, the epoxy functionalized particles, an epoxy base resin, CNTs and a solvent are mixed together into a solution to disperse the functionalized particles and the CNTs. At 22 the solution undergoes drying to remove the solvent, leaving an epoxy resin with functionalized particles and CNTs. This is then mixed with a curing agent at 24. A "print" process, such as extrusion printing or other 3D printing process, then uses the resulting material to form structures, or patterns, which are then cured.

In the below examples, specific compounds and percentages are used for the experiments. No limitation to such specific compounds in the specific percentages is intended, nor should any be implied. For example, the epoxy functionalized particles used consist of epoxy-reacted fluorographene, but other types of epoxy-functionalized particles may be used. Similarly, the wt % below of the epoxy functionalized particles is 15 wt % but could be anywhere in the range of 5 wt % to 20 wt % in 0.5 wt % steps, and the wt % of the CNTs is 1 wt % but could range anywhere from 0.1 wt % to 5 wt % in 0.1% steps.

Example 1

In a first example, an ink sample weighing 20 g resulted from mixing 3 g (15 wt %) of epoxy-reacted fluorographene (ERFG) particles with 15.8 g of epoxy base resin, in this case Epon 826 from Hexion Epoxy Systems, Inc. a high power ball mill with 3 mm spherical milling media. This resulted in well-dispersed ERFG particles in the resin was recovered from the mixer using acetone solvent and left overnight at 80° C. in air to partially remove the acetone. The inventors then added 0.2 g (1 wt %) of SWCNTs, in this example manufactured by Nanoamor (Nanostructured and Amorphous Materials, Inc.) to 2 ml of acetone solvent and mixed at 500 rpm in centrifugal planetary mixer. The CNT-acetone dispersion was added to the ERFG-epoxy mixture and mixed using milling medium in a planetary mixer. The resulting ERFG-CNT-epoxy-acetone mixture was dried overnight at 60° C. in an oven maintained at house vacuum (approximately 23 psig) to remove the acetone completely. A latent curing agent (~5 wt %) in the form of 1-ethyl-3-methylimidazolium dicyanamide, which is an ionic liquid available from Sigma-Aldrich was added to the mixture and mixed again.

Example 2

A similar formulation was prepared by replacing CNTs with COOH functionalized SWNTs.

Comparative "base" formulations without any particle fillers, and with ERFG particles only, meaning epoxy functionalized 2D particles, without addition of CNTs were also prepared to measure and compare their rheology and mechanical properties.

The rheological properties of formulations were measured to assess their printability. The steady shear viscosity measurements allows estimation of change in viscosity as a function of shear rate. The viscosities of all formulations display a shear thinning behavior as shown in FIG. 2, decrease in the viscosity with increase in the shear rate. However, the viscosity of formulation increases by almost 2 orders of magnitude at lowest shear rate after addition of 1 wt % CNT or 1 wt % CNT-COOH. When shear rate was increased, the viscosity decreased and reached almost a plateau value at shear rate of greater than 100/s, and then viscosity increases back again when the shear rate decreases. Having an optimally high viscosity at lowest shear rate is a key requirement for printable inks since it provides good control over extrusion printing. Rapid increase in viscosity when shear rate decreases is a critical indication of recovery of elasticity in the formulation. This is a desired rheological property in inks usable for extrusion printing. However, viscosity needs to be optimized to allow smooth printing without clogging of printer nozzles and yet have high enough viscosity to flow only when a force is applied.

Figure 3:
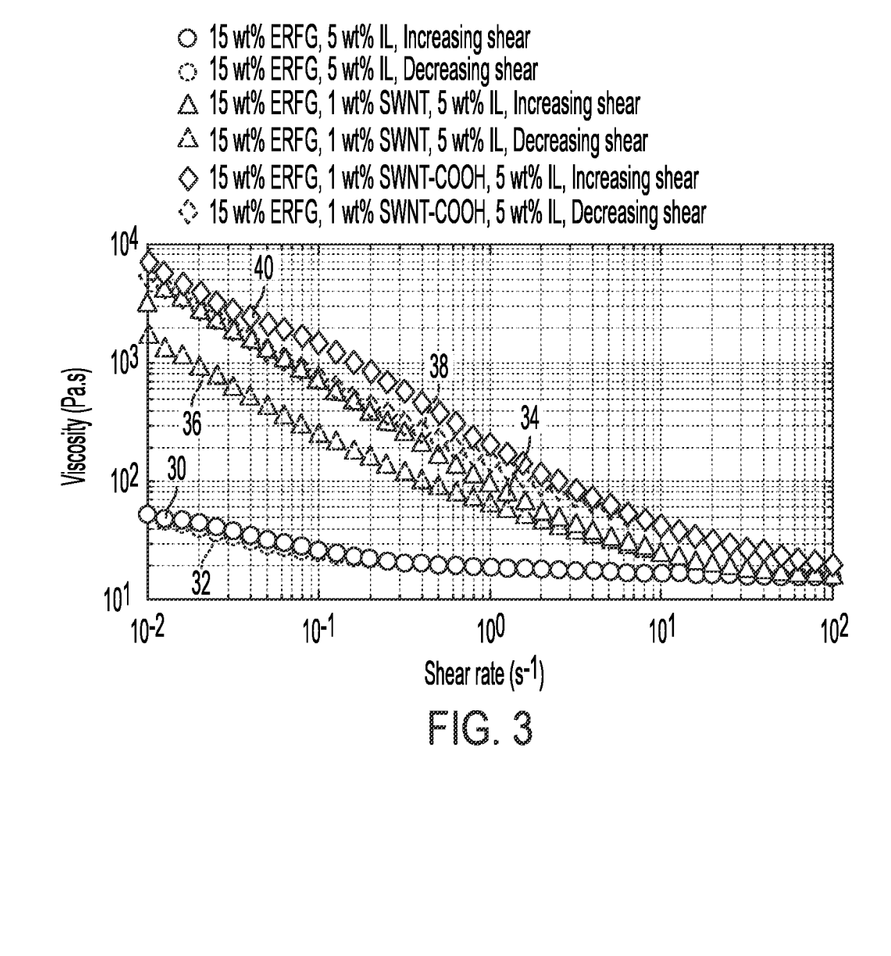
FIG. 3 shows a graph of viscosity versus shear rate for different compositions of matter.

FIG. 3 shows the viscosity-shear rate profile for different formulations. Viscosity measurements are recorded first with increasing shear, and after reaching set maximum value of shear, shear rate is decreased and viscosity is recorded. As used here, the term "formulation" here refers to the different embodiments of the formulation. The term "sample" refers to a same version of each formulation. In FIG. 2, the plot 30 shows data for 15 wt % ERFG, 5 wt % ionic liquid (IL), increasing shear, and plot 32 shows data for 15 wt % ERFG, 5 wt % ionic liquid (IL), decreasing shear. Plots 34 and 36 show the data for increasing and decreasing shear versions for the formulations with 1 wt % SWNTs, respectively. Plots 38 and 40 show the data for increasing and decreasing shear formulations in which the SWNTs are carboxylated, respectively. As can be seen in FIG. 2, the base formulation does not demonstrate the desirable viscosity versus shear profile, but the formulations with SWNTs or SWNT-COOH do demonstrate the desired profile.

Figure 4:
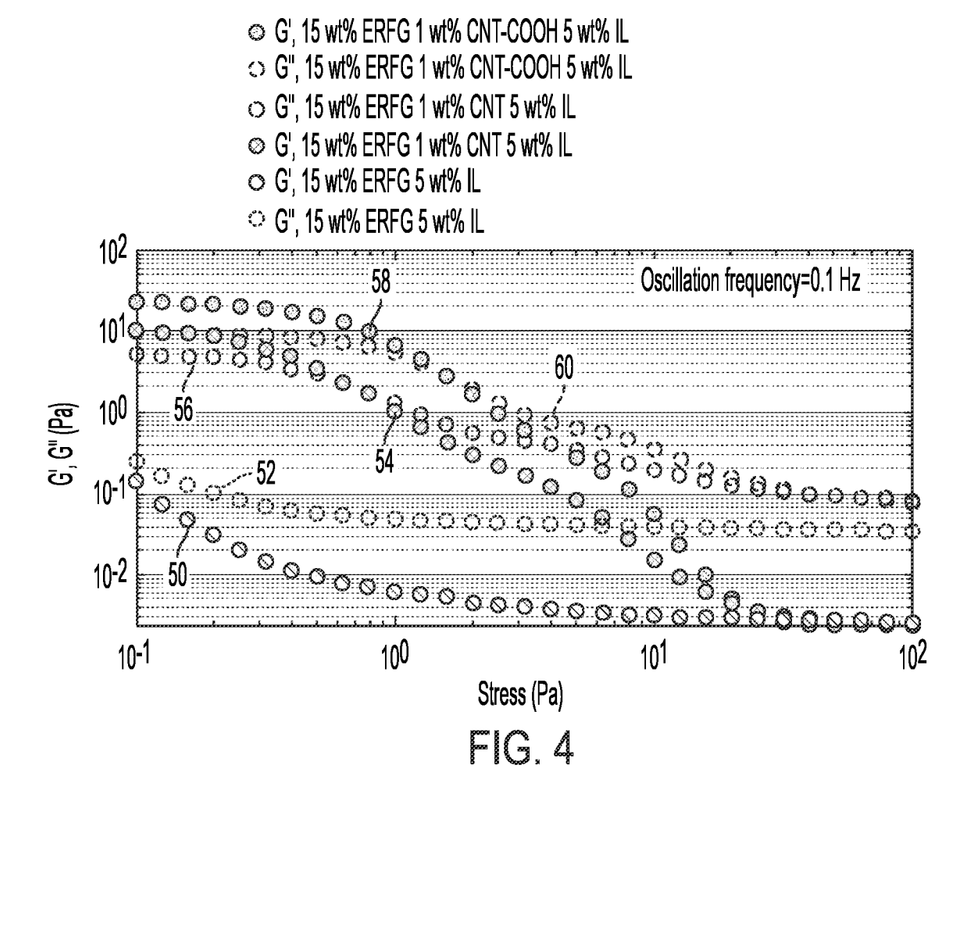
FIG. 4 shows a graph oscillatory stress sweep at a fixed oscillation frequency.

In FIGS. 4-7, at least two samples of each formulation were tested. FIG. 4 shows oscillation stress sweep of formulations performed at a fixed frequency (0.1 Hz), and displays significant increase in elasticity of inks with addition of 1 wt % CNT or 1 wt % CNT-COOH. Plot 50 shows the elastic contribution and 52 shows the viscous contribution data for the base formulation. Plot 54 shows the elastic contribution and 56 shows the viscous contribution data for the formulation having 1 wt % CNTs. Plot 58 shows the elastic contribution and 60 shows the viscous contribution data for the formulations with carboxylated CNTs.

The elastic contribution (G') is smaller than the viscous contribution (G") for all values of oscillatory stress for formulation without CNT. This indicates lower elasticity in these formulations, which can result in collapse of the structure after extrusion printing. However, the storage modulus (G') increases by almost 2 orders of magnitude and becomes higher than the loss modulus (G") at low oscillatory stress with addition of CNT and CNT-COOH fillers. The increase in elasticity allows structures to hold their shape without collapsing after extrusion printing.

Figure 5:
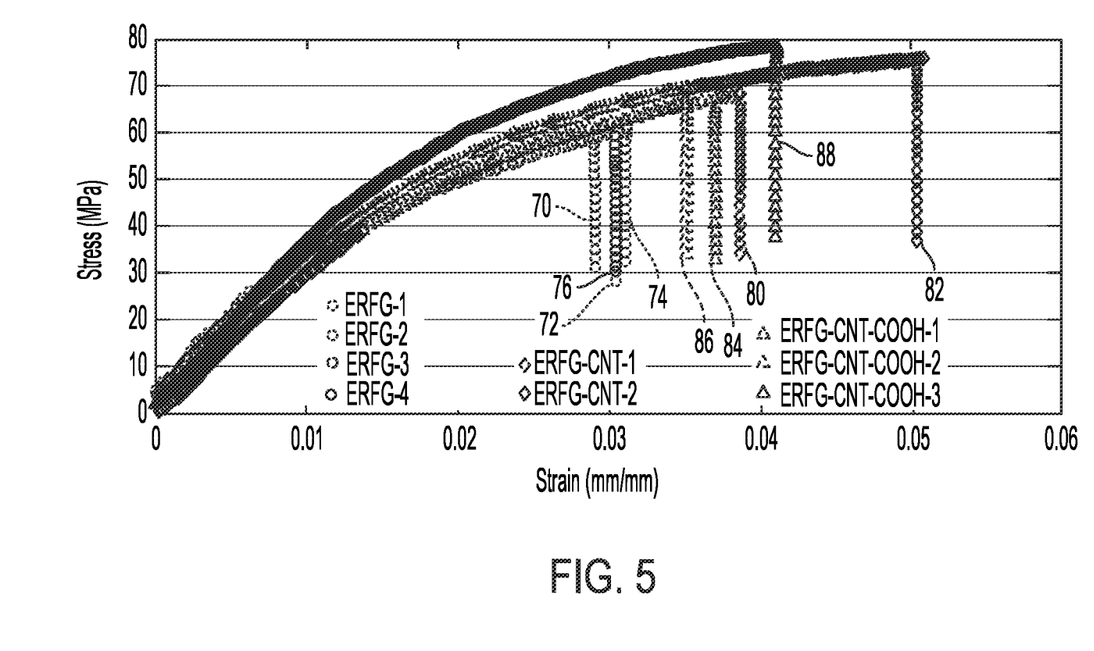
FIG. 5 shows a graph of stress-strain raw data.
Figure 6:
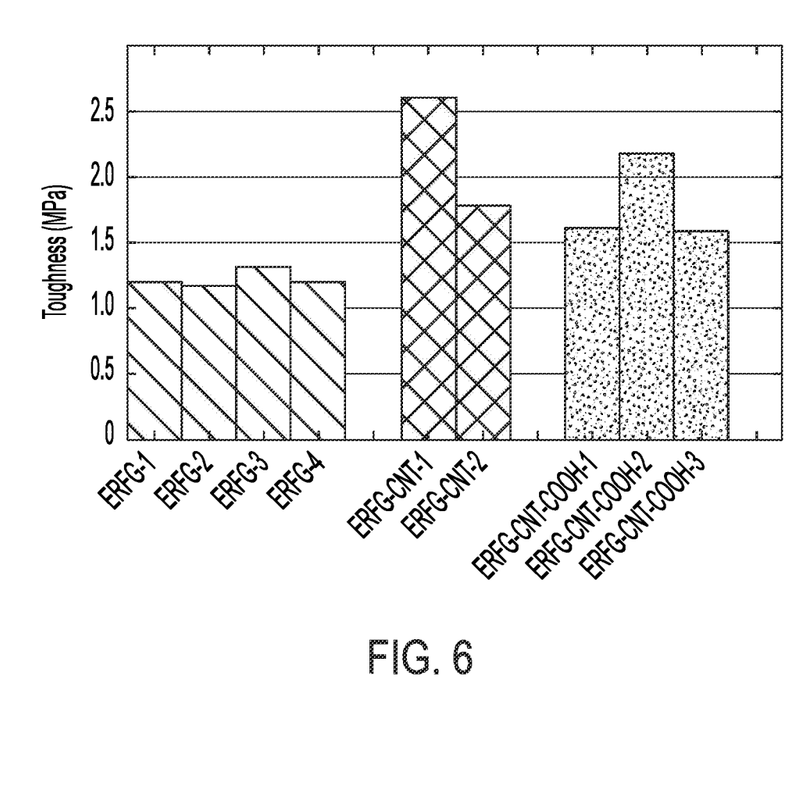
FIG. 6 shows a bar graph of toughness results.
Figure 7:
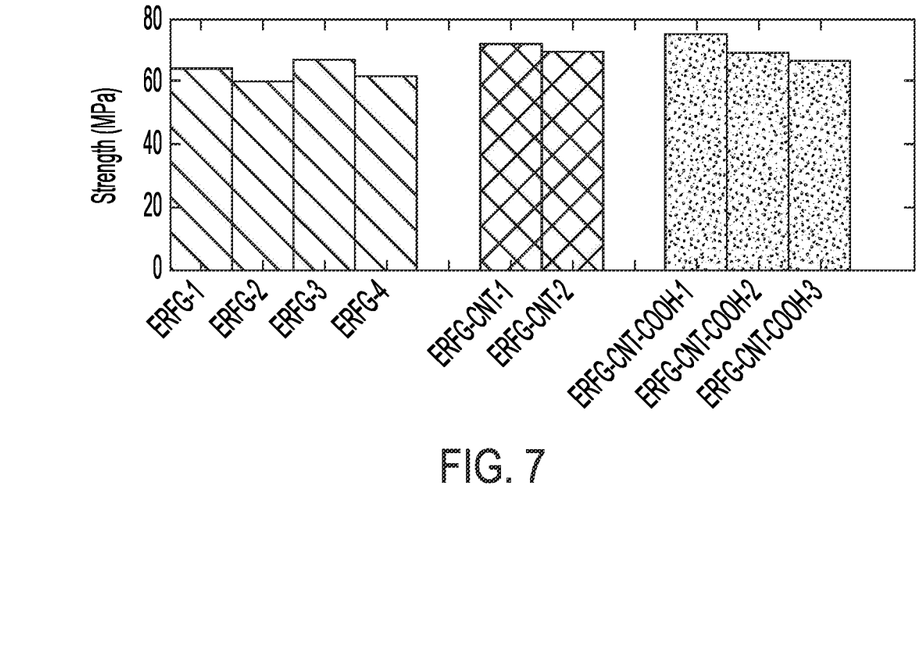
FIG. 7 show s bar graph of tensile strength data.

In FIGS. 5-7, show results from four samples of the base formulation as plots 70, 72, 74 and 76 in FIG. 5, two samples of the formulation with CNTs as plots 80 and 82 in FIG. 5, and three samples of the carboxylated CNT formulation as plots 84, 86 and 88 in FIG. 5. The samples consisted of cured structures in a "dogbone" shape formed from an open molding procedure followed by thermal curing. FIG. 5 shows the stress-strain raw data. This data shows that the CNT enhanced formulations possess a significantly increased toughness, while the elastic modulus remained relatively unaffected.

FIG. 6 shows toughness values for each sample. The data shows increased toughness for both CNT and CNT-COOH composites. In particular, the CNT composites have approximately an 80% increase in toughness when compared with cured samples of the base formulation. The carboxylated CNT composites show approximately a 50% increase in toughness.

FIG. 7 show the tensile strength data. The inks with CNTs, either carboxylated or not, show an approximately 10% average increase in strength compared to the base formulation. In addition, these inks displayed desired flow properties during printing and the printed structure held the shape until curing.

In this manner, one can increase the desired properties of printable composites used in manufacturing. Experiments showed that these composites have a more desirable shear, stress and strain profiles, and increased toughness and tensile strength compared to formulations with the same components but without the addition of CNTs.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

What is claimed is:

1. A composition of matter comprising at least 10 wt % epoxy reacted fluorographene particles functionalized two-dimensional shaped particles, carbon nanotubes in the range of 0.1 to 5 wt %, epoxy resin and a curing agent.

2. A composition of matter comprising at least 10 wt % epoxy functionalized two-dimensional shaped particles, carbon nanotubes in the range of 0.1 to 5 wt %, epoxy resin and 1-Ethyl-3-methylimidazolium dicyanamide as a curing agent.

3. The composition of matter as claimed in claim 1, wherein the two-dimensional shaped particles comprise one or more of functionalized graphene, clays, and alumina platelets.

4. The composition of matter as claimed in claim 1, wherein the carbon nanotubes are one of either bare or functionalized.

5. The composition of matter as claimed in claim 4, wherein the carbon nanotubes are functionalized with one of either at least one carboxyl group or at least one epoxy group.

6. The composition of matter as claimed in claim 1, wherein the composition of matter has a viscosity of at least 1000 Pascal-seconds at zero shear.

7. The composition of matter as claimed in claim 1, wherein the composition of matter has a viscosity of at least 10 Pascal-seconds at 100/s shear rate.

8. The composition of matter as claimed in claim 1, wherein the carbon nanotubes comprise single-walled carbon nanotubes.

9. The composition of matter as claimed in claim 1, wherein the curing agent comprises an ionic liquid.

10. The composition of matter as claimed in claim 1, wherein the curing agent comprises 1-Ethyl-3-methylimidazolium dicyanamide.

11. The composition of matter as claimed in claim 1, wherein the composition of matter has improved toughness over compositions of matter without carbon nanotubes of at least 50 percent.

12. The composition of matter as claimed in claim 1, wherein the composition of matter has improved tensile strength over compositions of matter without carbon nanotubes of at least 10 percent.

13. The composition of matter as claimed in claim 2, wherein the two-dimensional shaped particles comprise one or more of functionalized graphene, clays, and alumina platelets.

14. The composition of matter as claimed in claim 2, wherein the carbon nanotubes are one of either bare or functionalized.

15. The composition of matter as claimed in claim 14, wherein the carbon nanotubes are functionalized with one of either at least one carboxyl group or at least one epoxy group.

16. The composition of matter as claimed in claim 2, wherein the composition of matter has a viscosity of at least 1000 Pascal-seconds at zero shear.

17. The composition of matter as claimed in claim 2, wherein the composition of matter has a viscosity of at least 10 Pascal-seconds at 100/s shear rate.

18. The composition of matter as claimed in claim 2, wherein the carbon nanotubes comprise single-walled carbon nanotubes.

19. The composition of matter as claimed in claim 2, wherein the composition of matter has improved toughness over compositions of matter without carbon nanotubes of at least 50 percent.

20. The composition of matter as claimed in claim 2, wherein the composition of matter has improved tensile strength over compositions of matter without carbon nanotubes of at least 10%.

* * * * *